March 2, 1971  H. SCHWEIZER  3,566,664
APPARATUS FOR COLD AND WARM PRESSING
OF UNDERCUT PREPRESSED BODIES
Filed June 18, 1968  4 Sheets-Sheet 1

INVENTOR
Herbert Schweizer

March 2, 1971

H. SCHWEIZER 3,566,664

APPARATUS FOR COLD AND WARM PRESSING
OF UNDERCUT PREPRESSED BODIES

Filed June 18, 1968

INVENTOR
Herbert Schweizer

By

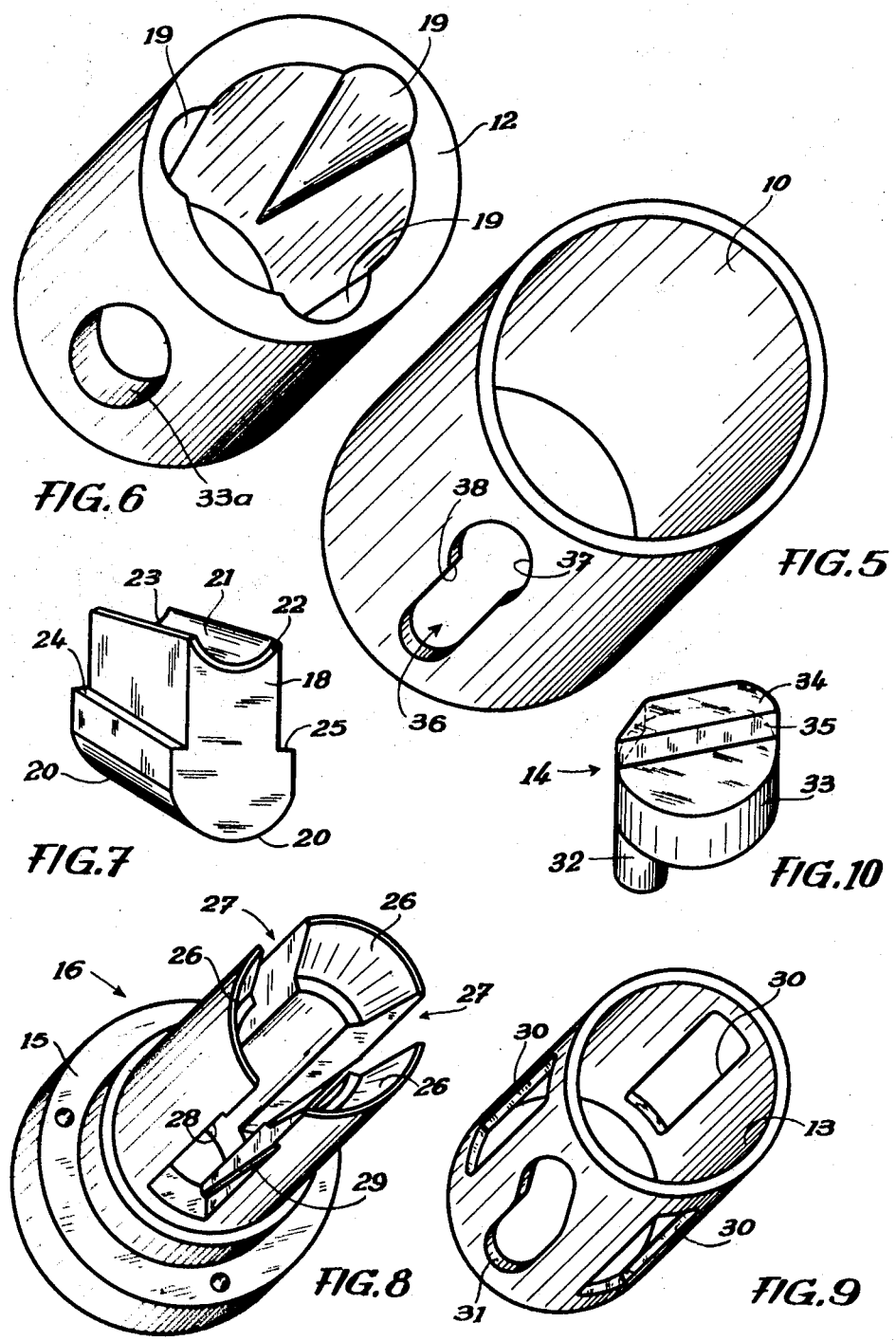

March 2, 1971  H. SCHWEIZER  3,566,664
APPARATUS FOR COLD AND WARM PRESSING
OF UNDERCUT PREPRESSED BODIES
Filed June 18, 1968  4 Sheets-Sheet 4
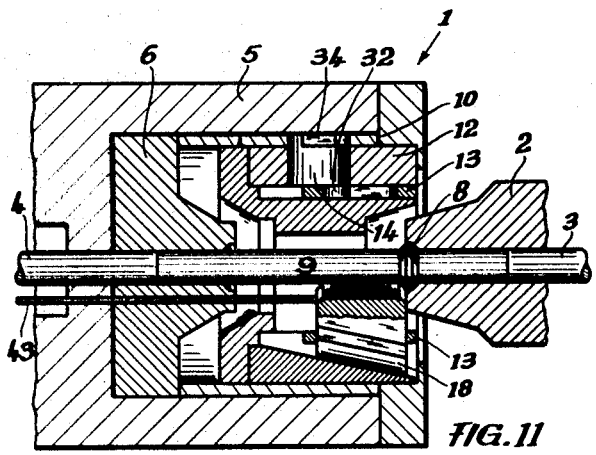
FIG.11
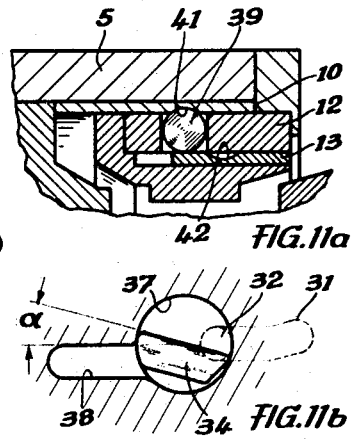
FIG.11a
FIG.11b
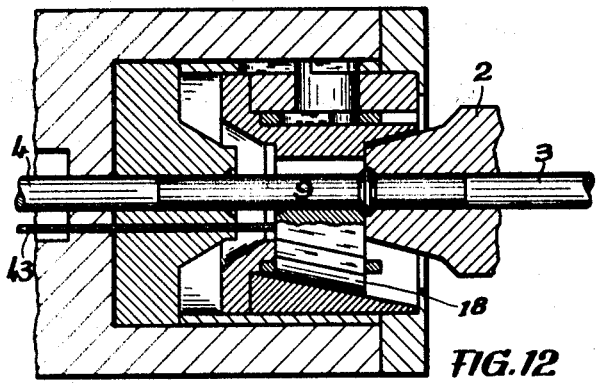
FIG.12
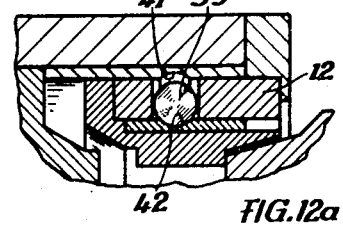
FIG.12a
FIG.12b
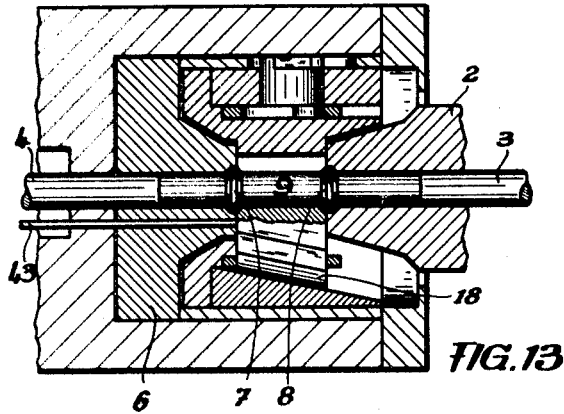
FIG.13
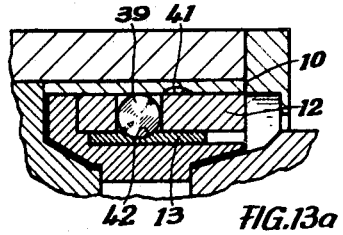
FIG.13a
FIG.13b
INVENTOR
Herbert Schweizer
By

United States Patent Office 3,566,664
Patented Mar. 2, 1971

3,566,664
APPARATUS FOR COLD AND WARM PRESSING OF UNDERCUT PREPRESSED BODIES
Herbert Schweizer, Kandern, Germany, assignor to F. B. Hatebur Aktiengesellschaft, Basel, Switzerland
Filed June 18, 1968, Ser. No. 737,873
Claims priority, application Germany, June 20, 1967, H 63,056
Int. Cl. B21d 41/00
U.S. Cl. 72—402                                          6 Claims

ABSTRACT OF THE DISCLOSURE

Device for press forming workpieces to form protuberances thereon in which an anvil body has a matrix member fixed in one end and a moveable matrix member axially moveable into the body at the other end. Radially moveable jaws in the body are actuated radially inwardly by axial movement of the moveable matrix member into the body so as to embrace a rod-like workpiece which has one end disposed in a hole in each matrix member. Further axial movement of the moveable matrix takes place together with the jaws so the workpiece is caused to change shape only in the unsupported region thereof between the fixed matrix member and the jaws.

---

The present invention relates to a device for cold and hot pressing of outwardly undercut prepressed raw workpieces. The chipless further shaping of a prepressed workpiece with a radially protruding collar frequently causes considerable difficulties because the already preformed undercut portion of the pressed workpiece must, during the new pressing operation not undergo any further deformation.

It is known to enclose the already preformed portion of the prepressed workpiece, on all sides in matrix jaws and to carry out the deformation, for instance, by radially effective pressing forces. With this type of deformation, it cannot be avoided that excessive material enters the separating gaps of the radially adjustable pressing jaws whereby burr or flash formation is unavoidable. The said burr or flash formation may in a manner known per se be avoided by pressing the workpiece in a closed forging die or the like. However, the already preformed portion of the pressed body must still be firmly enclosed by the matrix jaws prior to the start of the pressing operation. Advantageously, the closing and pressing operations can be effected automatically by the axial movement of the punch.

According to a heretofore known suggestion disclosed in U.S. Pat. No. 3,120,769, the matrix jaws will by means of a lever system on matrix carriers displaceable in axial direction in the anvil body close at the start of the unilaterally directed pressing movement, in view of an axial movement of the matrix jaws, which movement is effected against a spring force and is brought about by the pressing ram. During the closing of the matrix jaws, the latter rest against the matrix carrier. Consequently, the matrix jaws enclose the preformed portion of the pressed workpiece at the starting pressing pressure for forming the free end of the workpiece in the form of a closed matrix, whereby a burr formation on that portion of the pressed workpiece is excluded which is surrounded by the matrix jaws. In this way, the axially directed pressing forces can no longer act upon the already deformed portion of the pressed workpiece.

It is an object of the present invention to provide a device for cold and hot pressing of outwardly undercut prepressed workpieces such as a pressed workpiece provided with a radially protruding collar, according to which wear-sensitive lever means for radially adjusting the matrix jaws will not be necessary.

It is another object of this invention to provide a device as set forth in the preceding paragraph in which spring means for radially supporting the matrix jaws and the matrix carrier on the injection body will not be required, which spring means interfere with the desired automatic course of the individual movement during the pressing operation.

These and other objects and advantages of the invention will appear more clearly from the following specification in connection with the accompanying drawings, in which:

FIGS. 5–10 illustrate in perspective individual elements of the device according to FIG. 1, viz a bushing, a matrix carrier, a matrix jaw, a guiding cage, and a locking device;

FIG. 11 shows a section through a locking device according to FIG. 1 with opened matrix jaws after insertion of the preformed press body with a locking device of FIG. 3 which is shown in FIG. 11a in its respective pertaining position, and with the locking device in FIG. 11b shown sectioned along the bushing of FIG. 5 in its respective position;

Figure 1:
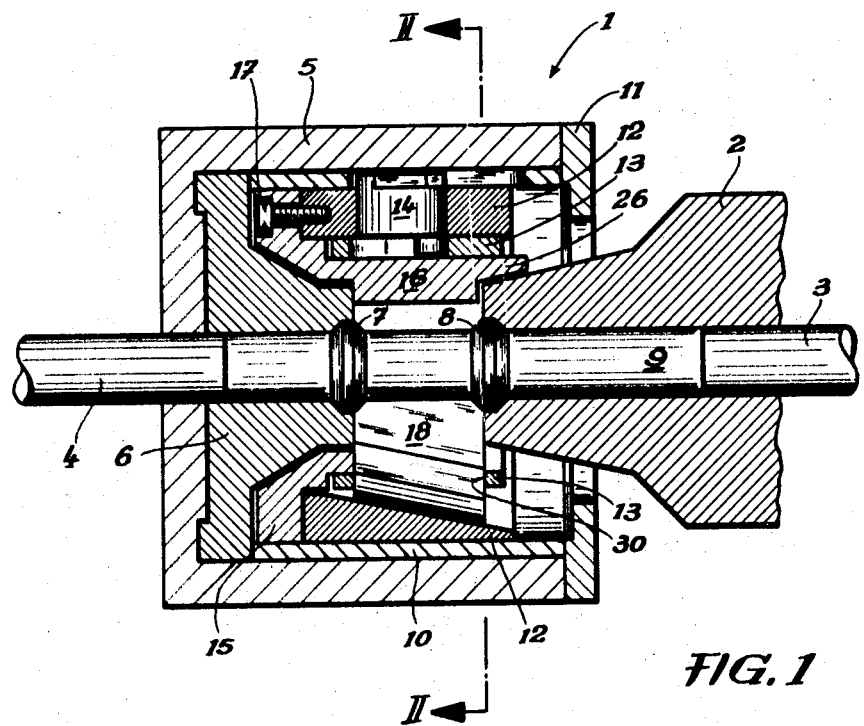
FIG. 1 is a section through a device according to the present invention shortly after shaping the pressed body and also shows a first embodiment of a locking device used in connection with the present invention.
Figure 3:
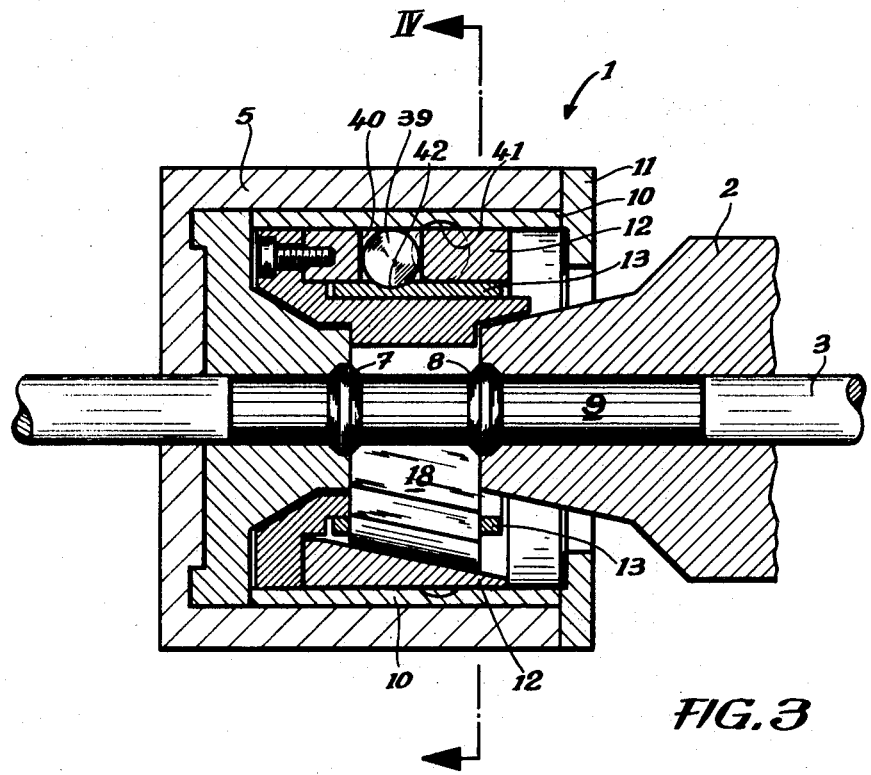
FIG. 3 represents a section through the device according to FIG. 1 with a modified locking device.

FIG. 12 represents a section through the device according to FIG. 11 with closed matrix jaws shortly prior to the further shaping of the pressed body, with the locking device according to FIG. 3 shown in the respective position of FIG. 12a, while FIG. 12b shows the locking position of FIG. 1 in the respective position; and FIG. 13 is a section through the device according to FIG. 12 after completion of the pressing operation, with the locking device of FIG. 3 illustrated in FIG. 13 in its respective position, and with the locking device of FIG. 1 shown in its respective position in FIG. 13b.

The present invention is based on a matrix carrier axially displaceable in an anvil body, which matrix carrier is provided with inclined guiding paths directed radially inwardly. Guiding matrix jaws centrally surrounding the pressed body slide with their back surfaces which are parallel to said guiding paths on the latter, and close in one axial displacement direction and open in the opposite displacement direction. Such matrix jaws which are outwardly cone-shaped in pressing direction and are usually composed of three sections, are employed, for instance, when undercut pressed bodies are to be produced in order thereby to prevent a jamming of the guiding surfaces for the matrix jaws with those surfaces of the matrix carrier. The inclination of the guiding surfaces can be such that following the pressing operation, the matrix jaws with the shaped pressed body therein can be moved out of the matrix carrier, for instance, by means of an ejector centrally displaceably arranged in the anvil body.

The invention is characterized primarily in that the matrix jaws axially displaceable by the press ram are embraced by an annular cage which in guiding pockets radially displaceable, receives the matrix jaws. The said annular cage is connected to the matrix carrier surrounding the same and to the anvil body embracing the matrix carrier, by means of a locking device in such a way that during the radial feeding of the matrix jaws brought about by the axial displacement of the press ram, the matrix carrier is together with the anvil body arrested against axial displacement. During a further axial displacement of the press ram for pressing the free end of the body to be pressed into a solid closed matrix, known per se, said body being embraced by the matrix jaws, the matrix carrier 12 with the matrix jaws 18 and the annular cage 13 is axially displaced relative to the anvil body 5 to an end position. In this way, the matrix jaws will in conformity with the displacement of the press ram be radially advanced while the matrix carrier is axially arrested, and the body to be pressed is with the matrix jaws in closed position subsequently pressed in the closed matrix without the pressing pressure being able to act on the already shaped portion of the pressed body. The device according to the present invention makes the employment of springs and lever systems superfluous, so that an automatic operation of the individual movements will be assured and a rapid wear of the device will be prevented.

The closed matrix centrally extends in a manner known per se through an ejector member which, after effected pressing operation, displaces the pressed body and also the individual matrix jaws from the matrix carrier in a direction opposite to the perssing direction. This ejector will be effected only when it contacts one end of the pressed body and during the axial displacement of said pressed body also through the latter ejects the matrix jaws and opens the same for ejecting the pressed body.

For reasons of safety, the bottom side of at least one matrix jaw may be engaged by an auxiliary ejector which is displaceable in the anvil body. In this way, a displacement of the matrix jaws and thereby of the pressed body opposite to the presssing direction, will be assured independently of the movement of the ejector.

For purposes of automatically opening the matrix jaws by the axial displacement thereof in a direction opposite to the pressing direction, the annular cage which axially embraces the matrix jaws may, in conformity with the present invention embrace a guiding cage with guiding pockets for radially guiding the matrix jaws. The walls of the guiding pockets provided on both sides may have guiding edges which are inclined parallelly to the guiding paths of the matrix carrier. The matrix jaws are by means of sliding edges arranged parallel to the sliding surfaces at the flanks thereof displaceable on the said inclined guiding edges.

Figure 2:
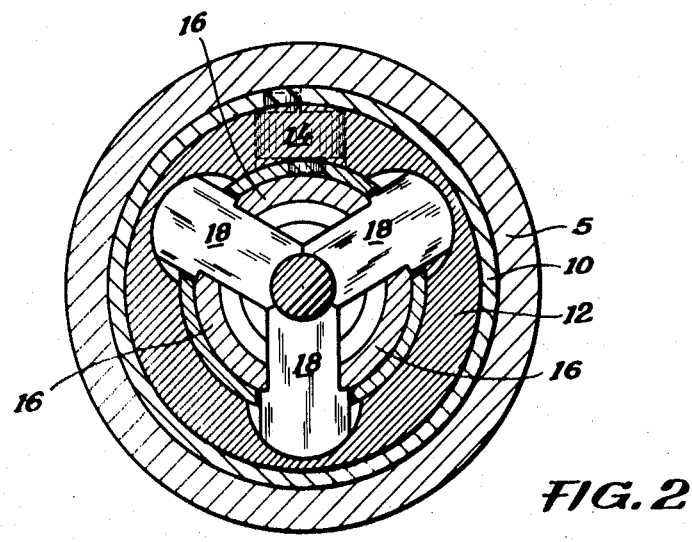
FIG. 2 is a section taken along the line II—II of FIG. 1.

Referring now to the drawings in detail, the device shown in FIGS. 1 and 2 (non-essential members have been omitted for the sake of clarity) shows the tool generally designated 1 and the press ram 2. The press ram 2 is driven by a non-illustrated driving mechanism of any standard type with an automatic axially directed oscillating movement. In a bore 1a coaxial with the bore for the press ram 2 there is provided an ejector 3, while opposite to said ejector 3 and coaxially located in the tool 1 there is axially displaceably arranged an ejector 4. The ejectors 3 and 4 are controlled in conformity with the movement of the press ram 2 for purposes of controlling the ejection movement, for instance, a cam coupled to the crank drive of the press ram 2 may be employed.

The anvil body 5 of the tool 1 is firmly mounted in the press frame (not illustrated). The closed matrix 6 is centrally arranged in the anvil body 5. The matrix 6 substantially comprises a cylindrical section and a frusto-conical section extending in the direction of the press ram. The end face of the frusto-conical section, similar to the end face of the press ram 2, is profiled in conformity with the respective radially protruding collars 7 and 8 of the press body 9 extending into the matrix chamber. The press body 9 extends into the central bore of the press ram 2 and also into the bore of the matrix 6 and is axially supported by the ejectors 3 and 4.

Adjacent the inner wall of the anvil body 5 there is provided a cylindrical bushing 10 which on one hand rests against the cylindrical portion of the matrix 6 and on the other hand rests against cover 11 closing the anvil body 5. The bushing 10 surrounds the axially displaceable matrix carrier 12 which in turn centrally surrounds the axially displaceable annular cage 13 or sleeve-like jaw cage. The bushing 10 of the matrix carrier 12 and the annular cage 13 are interconnected by means of the locking device generally designated 14, which will be described further below.

The cylindrical flange 15 is located peripherally on the matrix 6 which extends axially of the matrix carrier 12. The guiding cage generally designated 16 is a movable matrix member that extends radially inwardly adjacent to the annular cage 13, and by means of screws 17 is firmly connected to the matrix carrier 12 so that the guiding cage 16 and the matrix carrier 12 form a unit which is axially displaceable within the anvil body 5. The annular cage 13 peripherally surrounds the guiding cage 16 and the matrix carrier 12 axially surrounds the annular cage 13 and the three matrix jaws 18 shown in FIG. 2. The annular cage 13 thus is positioned between the carrier 12 and the guiding cage 16.

The individual elements referred to above and pertaining to the tool 1 will now be described more fully in connection with FIGS. 5–10. The matrix carrier 12 shown in perspective in FIG. 6 has a bore 33a for receiving the locking device 14 and has its inner side provided with three radially inwardly directed inclined guiding paths 19 in which the matrix jaws 18 centrally surrounding the pressed body will slide during their axial displacement. To this end, the matrix jaws 18 have one longitudinal side thereof provided with arched sliding surfaces 20 the radii of which, for purposes of facilitating the displacement of the matrix jaws 18 on the guiding paths 19 precisely correspond to the radii of the guiding paths 19. Those sides of the matrix jaws 18 which are located opposite the sliding surfaces 20 are so shaped that they surround the preshaped profile of the pressed body without play. The edges 22 and 23 at the end faces are shaped in conformity with the profile to be produced on the collars 7 and 8. The two flanks of each matrix jaw 18 are provided with sliding edges 24 and 25 parallel to the arched sliding surfaces 20. The sliding edges 24 and 25 are intended for guiding the matrix jaws 18, as will be further explained in connection with the guiding cage 16.

The guiding cage 16 illustrated in FIG. 8 comprises primarily a circular flange 15 having arranged adjacent thereto guiding arms 26 which are circumferentially offset with regard to each other by 120° and extend in the axial direction of said cage 16. The guiding pockets 27 provided between the guiding arms 26 serve for radially guiding the matrix jaws 18. To this end said guiding pockets 27 are provided with radially inwardly inclined guiding edges 28, 29 which are parallel to the guiding paths 19. The angle of inclination of these guiding edges corresponds to the angle of the guiding paths 19. The matrix jaws 18 having opposed side faces extend through the guiding pockets 27 that serve as a jaw guide having opposed side walls and by means of their guiding edges or shoulders 24, 25 carry behind the guiding edges or shoulders 28, 29 during the axial displacement of the matrix jaws so that on one hand, the radial movement of the matrix jaws 18 is limited, while on the other hand, during the axial movement of the matrix jaws 18 in a direction opposite to the pressing direction, the matrix jaws open automatically thereby releasing the press body 9 from their grasp.

The annular cage 13 which is axially displaceably arranged between the matrix carrier 12 and the guiding cage 16 and is illustrated more fully in FIG. 9, has three guiding pockets 30 circumferentially offset with regard to each other by 120°. These guiding pockets 30 radially displaceably receive the matrix jaws 18 inserted thereinto. This position is shown, for instance, in FIG. 1 in the lower portion of the tool 1. During an axial displacement of the matrix jaws 18, therefore, the annular cage 13 is automatically taken along by said matrix jaws while the jaws are adapted freely to move in radial direction in the guiding pockets 30 of the annular cage 13. Between two guiding pockets 30 an angled-off axial groove 31 milled into the annular cage 13. A bolt 32 of the locking device 14 shown in FIG. 10 engages the said groove 31.

The locking device 14 comprises a circular disc or lock member 33 having one end face provided with an outwardly extending shoe 34, said shoe being eccentrically located on one portion of the disc. The length of said shoe 34 is so selected that it corresponds to the diameter of the disc 33 and at its inner edge 35 is aligned with a diameter line of the disc 33. On the other end face of disc 33 there is eccentrically arranged a pivot 32 the axis of which is located on a diameter line which is inclined by an angle in the direction to the other disc portion at such a spacing from the center of disc 33 that it has a tangential plane in common with the disc 33.

The precise construction of the locking device 14 is in addition to FIG. 10 also shown in FIGS. 11b, 12b and 13b. The locking device 14 which is rotatably mounted in the bore 33a of the matrix carrier 12 extends by means of its pivot 32 radially inwardly into the axial groove 31 of the annular cage 13 and by means of its shoe 34 extends radially outwardly into the groove generally designated 36 of bushing 10 (groove 36 being shown in FIG. 5).

Figure 4:
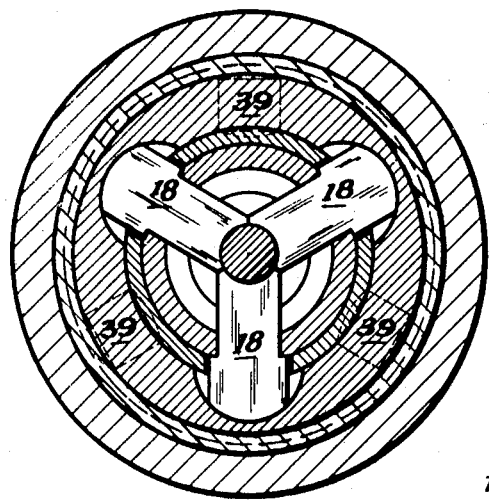
FIG. 4 is a section taken along the line IV—IV of FIG. 3.

Groove 36 comprises two portions, viz the circular section 37 the diameter of which equals the diameter of the disc 33, and the parallel groove section 38 extending in the pressing direction and having a width corresponding to the width of the shoe 34. Before referring in detail to the movements of the locking device during the displacement of the matrix jaws 18 in the pressing direction, reference may be had to the locking devices of FIGS. 3 and 4 which differ from each other as to design.

As device for locking the bushing 10 on alternate sides to the matrix carrier 12 or for locking the annular cage 13 to the matrix carrier 12, there are, according to this embodiment provided three barrel-shaped bodies 39. The bodies are, therefore, henceforth termed rollers. The rollers 39 are arranged in radial bores 40 of the matrix carrier. The bores 40 are likewise circumferentially offset with regard to each other by 120° and by 30° relative to the guiding paths 19 of the matrix carrier 12. The dimensions of these parts are so selected that they are able to receive the rollers 39 with play. The diameters of the rollers 39 perpendicularly with regard to the diameter of the bores 40 are, however, somewhat greater than the wall thickness of the matrix carrier 12 so that the rollers 39, depending on their position, unilaterally extend either into the radial groove 41 of the bushing 10 surrounded by the anvil body 5 or into the radial groove 42 of the annular cage 13, depending on the axial position of the matrix carrier 12 or the annular cage 13. The problem underlying the device described above consists, as mentioned above, in that at least a further collar 7 is to be shaped on the prepressed workpiece, which in this particular instance has a radially protruding collar 8. The shaping steps during the further shaping of the workpiece 9 are illustrated individually in FIGS. 11–13.

The workpiece 9 prior to advancing the press ram 2 into the position shown in FIG. 11 is introduced into the matrix chamber, for instance, by means of pliers (not shown) and is clamped between the two ejectors 3 and 4 centrally with regard to the anvil body 5. The individual portions of tool 1 are in their starting position, i.e. spaced from the matrix 6. In this position the matrix jaws 18 are moved radially outwardly and free the opening for introducing the workpiece 9. When said matrix jaws move in a direction opposite to the pressing direction at the end of the preceding revolution of the crank of the main driving mechanism, the matrix jaws 18 have displaced annular cage 13 so that the pivot 32 of the locking device 14 will in the one end position shown in FIG. 11b be located in the axial groove 31 of the annular cage 13. In this position, the shoe 34 of the locking device 14, which radially outwardly engages the groove 36 of bushing 10, has turned in clockwise direction by an angle α with regard to the axis of the tool 1 so that the bushing 10 and thereby the anvil body 5 are clamped to the matrix carrier 12 through the intervention of the shoe 34 and disc 33 of the locking body 14.

According to the other locking device of FIG. 11a, the roller 39 by means of its mantle engages the radial groove 41 of bushing 10, whereas the oppositely located mantle portion of roller 39 rests on the cylindrical surface of the annular cage 13. Also in this way, the bushing 10 and thus the anvil body 5 are clamped to the matrix carrier 12.

The coupling of the matrix carrier 12 to the anvil body 5 brings about that during the axial displacement of the press ram 2 from its position of FIG. 11 to its position of FIG. 12, in addition to the workpiece 9 and the two ejectors 3 and 4, only the matrix jaws 18 and the annular cage 13 surrounding the same are axially displaced. As a result, the matrix jaws 18 are slidably radially advanced on the radially inwardly directed inclined guiding paths 19 of the axially arrested matrix carrier 12 and in the position shown in FIG. 12 firmly embrace the already preformed portion of the workpiece 9. The matrix jaws, by means of their coaxially arranged surfaces 21, embrace the workpiece 9 on all sides and bring about the subsequently effective pressing pressure cannot affect the collar 8 so that no axially directed burr will form over the height of the pressing jaws.

During the axial displacement of the annular cage 13 in the direction of the working stroke, the pivot 32 is displaced in the groove 31 of the annular cage 13. When the pivot 32 during the displacement of the annular cage 13 has reached that portion of groove 31 which is angled-off in counter-clockwise direction, it will be evident that during a further axial displacement of the annular cage 13, the pivot 32 is displaced in groove 31 in counter-clockwise direction by the angle α by which the shoe 34 was tilted relative to the axial direction. From the displacement of the pivot 32 in counter-clockwise direction will result a turning of the shoe 34 in counter-clockwise direction in the circular portion 37 of groove 36 of bushing 10. When the pivot 32 reaches the other end position in the axial groove 31 of the annular cage 13, as shown in FIG. 12b, the shoe 34 will be axially arranged and will thereby have unclamped the matrix body 12 and bushing 10 and disconnected the same from the anvil body 5 because, during the further axial displacement of the annular cage 13, shoe 34 can move into the parallel groove 38 of the bushing 10.

With the locking device according to FIGS. 11a and 12a, the clamping of the matrix carrier 12 to the anvil body 5 is likewise disconnected by the axial displacement of the annular cage 13. The annular cage 13 coupled to the matrix jaws 18 in axial direction is also in this instance displaced in pressing direction while the radial groove 42 of the annular cage 13 is displaced toward the left with regard to FIG. 11a until it is located directly below the roller 39. From this instant on, illustrated in FIG. 12a, the matrix carrier 12 is no longer locked to the anvil body 5.

During a further development of the press ram 2 in working direction, the roller 39 will on one hand remain in the radial groove 42 of the annular cage 13, and on the other hand, will slide along the inner surface of the bushing 10. In this way, the roller 39 couples the matrix carrier 12 to the annular cage 13 and through the latter couples the matrix jaws 14 to the matrix carrier 12 and through the intervention of the latter also the guiding cage 16, so that the axial movement of the press ram 2 is conveyed to the total clamping unit comprising the individual members 12, 13, 16 and 18. After the unlocking of bushing 10 from the matrix carrier 12 in view of the turning of shoe 34 in counterclockwise direction, also with the locking device 14 a displacement of the clamping unit is possible because the shoe 34 will, during a further displacement of the annular cage 13, be displaced into the parallel groove 38 of bushing 10. The end position is shown in FIG. 13b. The end position of the longer clamping unit is illustrated in FIG. 13.

During the working stroke of the press ram 2 to the complete closing of the pressing jaws 18, the ejector 4 on the matrix side has moved under the influence of the cam disc (not shown) which is associated therewith, together with the workpiece 9 from the FIG. 11 position to the FIG. 12 position. This position is retained by the ejector 4 during the further displacement of the press ram 2, viz during the pressing operation, so that it is effective as counter-ram. The workpiece 9 which is on all sides embraced to the desired volume change on the collar 7 is, therefore, shaped by the pressure of the press ram 2. During the shaping operation, the individual tools move from the FIG. 12 position to the FIG. 13 position. The shaping operation thus starts with fully closed matrix jaws and nevertheless does not require any relative movement between the matrix jaws and the workpiece. In this way, a burr formation on the gaps of the matrix jaws will not occur and a uniform course of the fibers will be assured.

During the return stroke of the press ram 2, the ejector 4 which is coupled through the non-illustrated cam disc will move in the same direction and will press the workpiece 9 out of the matrix chamber. By means of the collar 7 and the auxiliary ejector 43 which engages the bottom side of at least one matrix jaw from the matrix 6, the annular cage 13, the guiding cage 16, and the matrix carrier 12 are through the matrix jaws 18 moved into the FIG. 12 position. In this position, in reverse sequence with regard to the sequence described so far, the locking between the annular cage 13 and the matrix carrier 12 is made ineffective and the coupling between the matrix carrier 12 and the bushing 10 and thereby with the anvil body 5 is effected. This is effected according to the device of FIGS. 11a, 12a and 13a by the displacement of the roller 39 from the radial groove 42 into the radial groove 41 of the bushing 10, whereas, according to the locking device of FIGS. 11b, 12b and 13b it is effected by turning the shoe 34 in clockwise direction in view of the displacement of the pivot 32 in clockwise direction in groove 31 of the annular cage 13. From this instant on, only the matrix jaws 18 with the annular cage 13 are axially displaced until the starting position thereof according to FIG. 11, has again been reached. If desired, the ejector 4 may eject the pressed body 9 completely out of the matrix chamber so that it either drops into a collecting container or is grasped by transverse transporting grippers and for further processing is conveyed to the next processing station.

If it should occur that the press ram 2 performs a stroke while no press body is located between the matrix jaws or if the free end of the body 9 is too short for shaping a collar 7, the return movements of the clamping units can no longer be initiated by the ejector 4 through the intervention of the collar 7 of the body 9. Particularly for this purpose there is provided an auxiliary ejector 43 which independently of the body 9 clamped between the ejectors 3 and 4 displaces the matrix jaws 18 in a direction opposite to the pressing direction.

It is, of course, to be understood, that the present invention is not limited to the particular construction shown in the drawing, but that the scope of the invention is defined by the appended claims.

What I claim is:

1. A device for pressing partially preformed workpieces of deformable material to produce outwardly protruding means thereon comprising: a hollow anvil body, a matrix member fixed in one end of said anvil body and having a central hole to receive one end of a workpiece to be pressed, a moveable matrix member spaced from said fixed matrix member and moveable axially into said anvil body toward said fixed matrix member, said moveable matrix member having a central hole aligned with the central hole in said fixed matrix member and adapted to receive the other end of the workpiece to be pressed, a matrix carrier sleeve reciprocable in said anvil body having guide means on the inner surface converging toward said fixed matrix, matrix jaws having their radially outer ends engaging said guide means, a jaw guide stationary with and coaxial with said carrier sleeve and confining said jaws against circumferential movement in said carrier sleeve while permitting axial and radial movement relative thereto, a sleeve-like jaw cage reciprocably supported in said carrier sleeve and having guide holes through which said jaws extend radially with small axial clearance, and mechanical locking means operatively connecting said carrier sleeve to said anvil body and to said cage and operable to lock said carrier sleeve in its axially outermost position in said anvil body when said cage is in its axially outer position in said carrier sleeve and operable to release said carrier sleeve from said anvil body while locking the carrier sleeve to said cage in response to axially inward movement of the cage in said carrier sleeve to its innermost position therein and wherein said matrix jaws are displaced radially inwardly by their axial movement along said guide means into position where the said workpiece is firmly embraced by the radially inner ends of said matrix jaws, said matrix jaws being engaged by said moveable matrix member to move said jaws and cage axially to the said innermost position of said cage in said carrier sleeve and thereafter said jaws and cage and carrier sleeve moving as unit together with said moveable matrix member toward said fixed matrix member whereby the workpiece is caused to change shape only in the unsupported region thereof between said fixed matrix member and said matrix jaws.

2. A device according to claim 1 in which said locking means comprises at least one lock member carried by said matrix carrier sleeve and displaceable therein radially but not axially, said lock member having a greater radial dimension than the radial thickness of said carrier sleeve so as to project radially from the carrier sleeve on one or the other of the radially inner and outer sides of the carrier sleeve, said anvil body having a recess on the inside to receive the projecting portion of said lock member complementary thereto when said carrier sleeve is in its said outermost position therein, and said cage having a recess on the outside to receive the projecting portion of said lock member complementary thereto when said cage is in its said innermost position in said carrier sleeve.

3. A device according to claim 1 in which said lock member comprises a disc rotatable in said carrier sleeve and having a bar-like shoe projecting from the outer end thereof into said anvil body and an eccentric pin projecting from the inner end thereof into said cage, an axial groove in said anvil body nonrotatably receiving said shoe in one rotated position only of said disc and terminating at its axially outer end in an enlarged region which registers complementary with said disc when said carrier sleeve is in its said outermost position, said enlarged region releasing said shoe so said disc can rotate, said cage having a slot closely receiving said pin, said slot having an axial portion and an inclined portion at the axially outer end of said axial portion, the axial portion of said slot holding said disc in a rotated position other than said one rotated position and the inclined portion of said slot rotating said disc into said one rotated position when said pin reaches the outer end of said inclined portion of the slot, said pin reaching said outer end of said inclined portion of said slot when said cage reaches its said innermost position in said carrier sleeve.

4. A device according to claim 1 which includes an axially reciprocable auxiliary ejector rod displaceable in said anvil body and adapted to engage the end of at least one matrix jaw on the end thereof facing said fixed matrix member.

5. A device according to claim 1 in which said jaw guide is provided with axial slots through which said matrix jaws extend, said axial slots having opposed side walls and said matrix jaws having opposed side faces disposed adjacent said side walls, said side walls having radially outwardly facing shoulders thereon inclined so as to be parallel to the said guide means for the respective matrix jaw, and said side faces having radially inwardly facing shoulders engaging the respective shoulders on the said side walls and inclined at the same angles whereby the radial movement of said matrix jaws is always positively effective during displacing movement thereof in both inward and outward directions.

6. A device according to claim 1 which includes ejector means reciprocably mounted in said central holes in said matrix members and said anvil body.

References Cited
UNITED STATES PATENTS

| | | | |
|---|---|---|---|
| 3,381,515 | 5/1968 | Orloff | 72—354 |
| 1,977,164 | 10/1934 | Wilcox | 10—18 |
| 3,120,769 | 2/1964 | Hatebur | 72—354 |

CHARLES W. LANHAM, Primary Examiner

M. J. KEENAN, Assistant Examiner

U.S. Cl. X.R.

72—354, 357, 302